United States Patent
Schmalkoke et al.

(10) Patent No.: US 12,472,792 B2
(45) Date of Patent: Nov. 18, 2025

(54) DEVICE FOR OPERATING A CHASSIS OF A TWO-TRACK VEHICLE

(71) Applicant: AUDI AG, Ingolstadt (DE)

(72) Inventors: Christian Schmalkoke, Ingolstadt (DE); Hanno Stingl, Kipfenberg (DE); Timo Strutz, Wettstetten (DE); Tobias Templer, Hitzhofen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/904,318

(22) Filed: Oct. 2, 2024

(65) Prior Publication Data

US 2025/0162373 A1    May 22, 2025

(30) Foreign Application Priority Data

Nov. 21, 2023   (DE) .......................... 102023132395.4

(51) Int. Cl.
*B60G 17/015*   (2006.01)
*B60G 17/0165*   (2006.01)
(Continued)

(52) U.S. Cl.
CPC ..... *B60G 17/0165* (2013.01); *B60G 17/0155* (2013.01); *B60G 17/033* (2013.01);
(Continued)

(58) Field of Classification Search
CPC ............ B60G 17/0165; B60G 17/0155; B60G 17/033; B60G 17/052; B60G 17/08; B60G 15/12; B60G 2202/30; B60G 2202/412; B60G 2202/416; B60G 2204/62; B60G 2400/0511; B60G 2500/326; B60G 2600/182; B60G 2600/20; B60G 2800/0124; B60G 2800/9124; B60Q 9/00
See application file for complete search history.

(56) References Cited

U.S. PATENT DOCUMENTS 6,554,293 B1 *  4/2003  Fennel .................. B60T 8/1708
                                                     280/5.506
11,529,836 B1 *  12/2022  Schubart .............. B60G 21/073
(Continued)

FOREIGN PATENT DOCUMENTS

DE        10316760 A1    10/2004
DE     102014012841 A1    3/2016
(Continued)

OTHER PUBLICATIONS

Search Report issued on Jun. 6, 2024, in corresponding German Application No. 102023132395.4, 8 pages.

*Primary Examiner* — Toan C To
(74) *Attorney, Agent, or Firm* — Maier & Maier, PLLC

(57) ABSTRACT

A device for operating a chassis of a two-track vehicle, in which each vehicle wheel is assigned a suspension spring, which carries the static body weight of the vehicle, and a vertical dynamics actuator, which is actuatable by a vertical dynamics control unit, having a tipping detection function which detects a tipping situation with a roll-over risk in which there is a danger that the vehicle will tip sideways on a transversely inclined roadway. When a roll-over risk is detected, the vertical dynamics control unit actuates the vertical dynamics actuators to avoid roll-over.

12 Claims, 3 Drawing Sheets

(51) Int. Cl.
  *B60G 17/033* (2006.01)
  *B60G 17/052* (2006.01)
  *B60G 17/08* (2006.01)
  *B60Q 9/00* (2006.01)
  *B60G 15/12* (2006.01)

(52) U.S. Cl.
  CPC ........... *B60G 17/052* (2013.01); *B60G 17/08* (2013.01); *B60Q 9/00* (2013.01); *B60G 15/12* (2013.01); *B60G 2202/30* (2013.01); *B60G 2202/412* (2013.01); *B60G 2202/416* (2013.01); *B60G 2204/62* (2013.01); *B60G 2400/0511* (2013.01); *B60G 2500/326* (2013.01); *B60G 2600/182* (2013.01); *B60G 2600/20* (2013.01); *B60G 2800/0124* (2013.01); *B60G 2800/9124* (2013.01)

(56) References Cited

U.S. PATENT DOCUMENTS

| | | | | |
|---|---|---|---|---|
| 11,904,841 | B2* | 2/2024 | Vandersmissen | B60G 11/265 |
| 12,059,937 | B2* | 8/2024 | Boon | B60G 21/103 |
| 2002/0056582 | A1* | 5/2002 | Chubb | B60R 16/0233 |
| | | | | 180/197 |
| 2002/0139599 | A1* | 10/2002 | Lu | B60T 8/17554 |
| | | | | 303/146 |
| 2003/0163231 | A1* | 8/2003 | Meyers | B60T 8/17554 |
| | | | | 701/1 |
| 2006/0155440 | A1* | 7/2006 | Gleacher | B60G 17/0195 |
| | | | | 701/38 |
| 2007/0162204 | A1* | 7/2007 | Moshchuk | B60W 40/114 |
| | | | | 701/38 |
| 2008/0040000 | A1* | 2/2008 | Chen | B60G 17/0162 |
| | | | | 701/38 |
| 2008/0119984 | A1* | 5/2008 | Hrovat | B62D 9/00 |
| | | | | 701/41 |
| 2008/0243334 | A1* | 10/2008 | Bujak | B60G 17/0195 |
| | | | | 701/37 |
| 2009/0299546 | A1* | 12/2009 | Hac | B60R 21/0132 |
| | | | | 701/1 |
| 2012/0078470 | A1* | 3/2012 | Hirao | B60W 10/22 |
| | | | | 701/1 |
| 2014/0012468 | A1* | 1/2014 | Le | B60G 17/019 |
| | | | | 701/45 |
| 2015/0217619 | A1* | 8/2015 | Benevelli | B60G 17/056 |
| | | | | 280/124.106 |
| 2018/0251123 | A1* | 9/2018 | Sigmar | B62D 17/00 |
| 2021/0394575 | A1* | 12/2021 | Nong | B60G 17/0162 |
| 2022/0332159 | A1* | 10/2022 | Corsico | B60G 3/20 |
| 2023/0382174 | A1* | 11/2023 | Coleman | B62D 53/062 |
| 2024/0116493 | A1* | 4/2024 | Zhu | B60G 17/0163 |

FOREIGN PATENT DOCUMENTS

| | | |
|---|---|---|
| DE | 102016005860 B3 | 4/2017 |
| GB | 2601355 A | 6/2022 |

* cited by examiner

DEVICE FOR OPERATING A CHASSIS OF A TWO-TRACK VEHICLE

FIELD

The invention relates to a device for operating a chassis of a two-track vehicle.

BACKGROUND

In an off-road vehicle of this type, each of the vehicle wheels is assigned a suspension spring, which carries the static body weight of the vehicle, and a vertical dynamics actuator. This actuator is actuatable by a vertical dynamics control unit on the basis of driving operating parameters. In addition, the off-road vehicle has a tipping detection function that detects a tipping situation with a roll-over risk, in the event of which there is a danger that the vehicle will tip sideways on a transversely inclined road.

For such an off-road vehicle, robustness against a static roll-over when stopping, parking, or when the vehicle is driving continuously on a transversely-inclined road is an important property. In the current prior art, roll-over prevention is adjusted by conceptual variables such as track width, center of gravity, axle kinematics, and transverse stabilization. However, these conceptual variables can only be changed within certain limits and compete with other requirements.

A method for operating a level control system of a motor vehicle is known from DE 103 16 760 A1. It comprises a control device, sensors for directly or indirectly determining the distance of the vehicle body from the axles of the vehicle wheels, and actuators for adjusting the distance of the vehicle body from these wheel axles. On the basis of the determined measured values, the control device checks in a target-actual comparison whether the inclination of the vehicle body exceeds predetermined limiting values, wherein if these limiting values are exceeded, one or more of the actuators are activated in order to achieve level compensation in the sense of a horizontal alignment of the vehicle body. A level controller for adjusting a chassis of a motor vehicle is known from DE 10 2014 012 841 A1. It comprises a device for detecting an angle of inclination of at least one axle of the motor vehicle in relation to a preferably horizontal reference plane. At least one actuator is actuatable depending on the detected angle of inclination. This actuator is designed to adjust at least one component of the chassis of the motor vehicle when stationary in such a way that the angle of inclination is reduced.

SUMMARY

The object of the invention is to provide a device for operating a chassis of a two-track vehicle, using which in particular static roll-over avoidance when parking, stopping, or when the vehicle is driving continuously on a transversely inclined roadway can be implemented in an operationally reliable manner and in a simple manner in comparison to the prior art.

The invention is based on a device for operating a chassis of a two-track vehicle, in which each vehicle wheel is assigned a suspension spring, which carries the static body weight of the vehicle, and a vertical dynamics actuator. All vertical dynamics actuators are controlled by a vertical dynamics control unit based on current driving operating parameters. The device also has a tipping detection function. This detects a static tipping situation with a roll-over risk in particular. With a roll-over risk, there is the danger that the vehicle will tip sideways on a transversely inclined road, in particular when parking, stopping, or when the vehicle is driving continuously on a slope on the transversely inclined roadway According to the characterizing part of claim 1, when a roll-over risk is detected, the vertical dynamics control unit actuates the vertical dynamics actuators to avoid roll-over. This allows the vehicle center of gravity to be lowered suddenly. In addition, the roll angle can be reduced by increasing the spring deflection on the uphill side of the vehicle until the vehicle is in a tipping-proof body position. With the aid of the vertical dynamics actuator, the tipping-proof body position of the vehicle can be set almost instantly. The vertical dynamic actuators can operate electromechanically or hydraulically.

In a first embodiment, the vertical dynamics control unit can automatically actuate the vertical dynamics actuators if a tipping situation occurs. Alternatively and/or additionally, the anti-tipping function can have a display means that triggers a warning message for the user if a tipping situation is detected. Moreover—alternatively to the automatic actuation—the device can have an input means operable by the user, in particular a rescue button. Using the input means, the user can actuate the vertical dynamics control unit so that the vertical dynamics actuators adjust the vehicle into the tipping-proof body position without any time delay.

In a specific embodiment, the suspension spring can be an air spring whose air chamber is integrated in a pneumatic circuit together with an air compressor acting as an actuator and with at least one vent valve. In the pneumatic circuit, the air compressor and the vent valve are actuated by an air spring control unit on the basis of driving operating parameters, in particular to carry out level control. The air spring can be used as a slow actuator, while the vertical dynamics actuator can be used as a fast actuator.

Both the air spring control unit and the vertical dynamics control unit can be actuated by an evaluation unit. The evaluation unit can have a signal connection to with the tipping detection function. If a tipping situation occurs, the evaluation unit first actuates the vertical dynamics control unit in order to bring the vehicle into the tipping-stable body position without time delay, while the air spring control unit is not yet actuated.

By actuating the vertical dynamics actuators, the vehicle body can be lowered suddenly. The vertical dynamics actuators work against the spring force generated by the air springs. Providing the tipping-proof body position with the aid of the vertical dynamics actuators is very energy-intensive in the long term, since the vertical dynamics actuators can only keep the vehicle in its tipping-proof body position with the aid of external energy, i.e. electrical energy. The following control strategy is preferred: The evaluation unit can actuate the vertical dynamics control unit until a predefined holding period has elapsed, so that the vertical dynamics actuators keep the vehicle in its tipping-proof body position. After the holding period has elapsed, the evaluation unit can actuate the air spring control unit to start a level control. During this level control, the air pressure acting in the respective compression spring and thus the spring force generated by the air spring is dissipated by opening the vent valve. The spring force in the air springs is dissipated until the tipping-proof body position is held by the air springs alone, while the energy-intensive vertical dynamics actuators can be relieved, i.e. are not functional.

The vent valve of the air springs can be actuated electrically by the air spring control unit. It is preferred if the vent valve is closed when de-energized. In this way, the tipping-proof body position can be maintained without external energy after the holding period has elapsed.

In a specific embodiment, each of the vehicle wheels can be assigned a telescopic shock absorber having a damper tube into which a piston rod plunges as a damper device. The hydraulic chambers delimited by the piston rod can be integrated into a hydraulic circuit together with an oil pump acting as an actuator, in which the oil pump is actuatable by the vertical dynamics control unit. In this case, the telescopic shock absorber therefore forms a hydraulically operating vertical dynamics actuator.

According to the invention, the static risk of tipping in relevant driving situations is improved by controlling active forces (generated by the vertical dynamics actuators). This is achieved by compensating for support effects due to the tire lateral forces (downhill forces) on the downhill-side wheel suspension by active spring deflection; and/or by reducing the height of the center of gravity as a result of lowering of the center of gravity by active spring deflection on the uphill side. This means that the tipping-proof body position can be quickly reached by means of the active forces. For the static case (i.e. stopping, parking, and continuous driving on a slope), the tipping-proof body position is permanently ensured by adjusting the level control. The active traction forces on the vehicle axles are replaced by a reduced level position.

By means of the method according to the invention, the roll-over stability can be improved suddenly, i.e. immediately in real time, by active forces. In comparison to a conventional roll system, the vertical dynamics actuators can apply body-attracting forces to the vehicle wheels on both sides of the vehicle and thus lower the center of gravity. Due to the assumption of the tipping-proof body position by a static level control system, the optimized roll-over behavior can also be permanently ensured, for example when stationary or when parking.

BRIEF DESCRIPTION OF THE FIGURES

An exemplary embodiment of the invention is described below on the basis of the appended figures.

In the figures.

DETAILED DESCRIPTION

Figure 1:
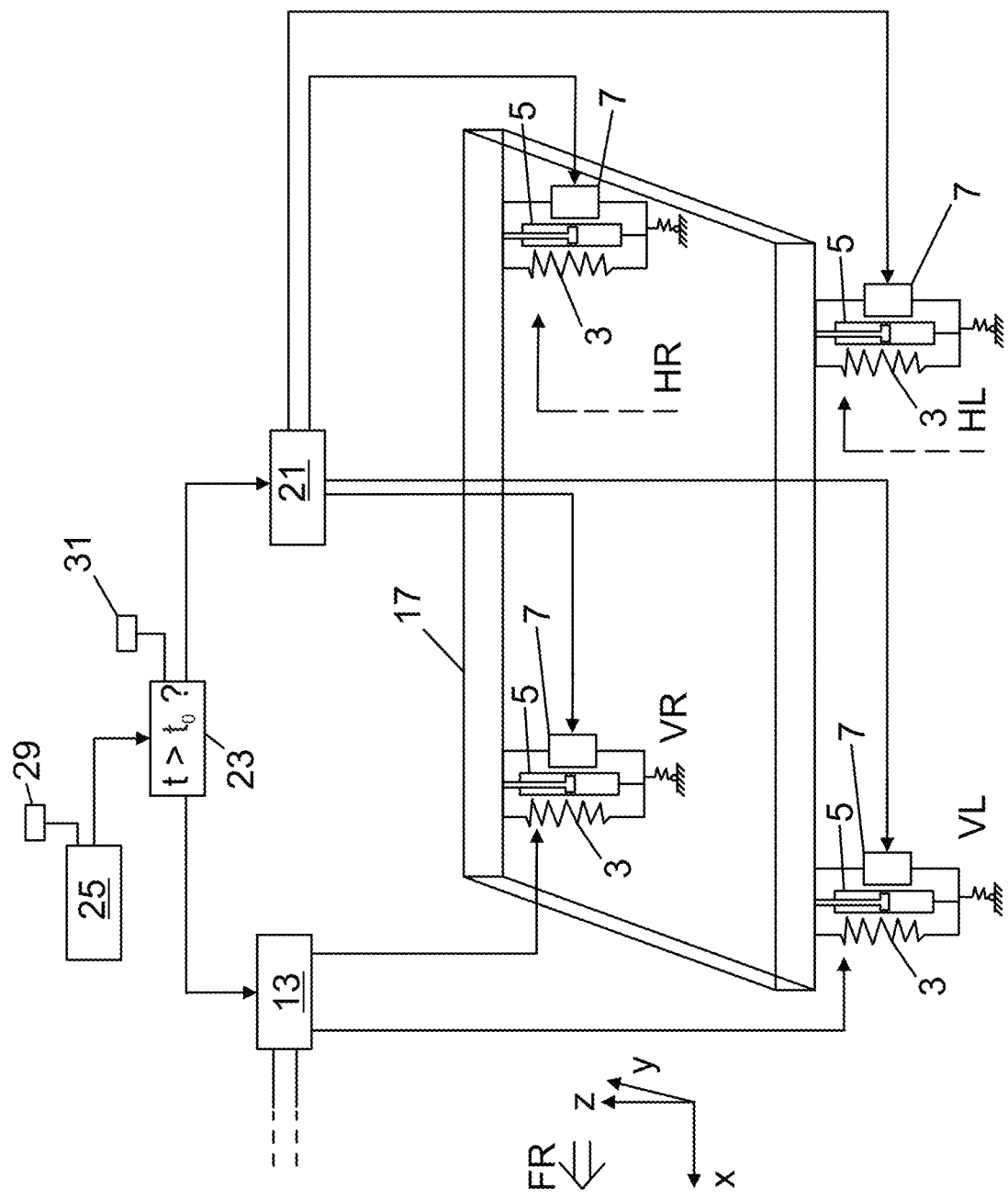
FIG. 1 shows a view describing the structure and the mode of operation of the active chassis according to the invention.

In FIG. 1, an equivalent circuit diagram of an active chassis of a two-track vehicle is indicated to the extent that it is necessary for understanding the invention. Accordingly, each of the vehicle wheels HL, HR, VL, VR is assigned a vibration/damping device, each of which is formed from a suspension spring 3, a telescopic shock absorber 5, and a vertical dynamics actuator 7. In the present exemplary embodiment, the suspension spring 3 is an air spring having an air bellows, as shown in the equivalent circuit diagram in FIG. 2. Accordingly, the air spring 3 delimits an air chamber 9, which is integrated together with an air compressor 11 and a vent valve 13 in a pneumatic circuit P, which is only indicated in FIG. 2. In the pneumatic circuit P, the air compressor 11 and the vent valve 13 are actuated by an air spring control unit 15 to perform a level control or height adjustment of the vehicle body 17. Both the vent valve 13 and the air compressor 11 are electrically actuated by the air spring control unit 13. The vent valve 13 is closed when de-energized.

Figure 2:
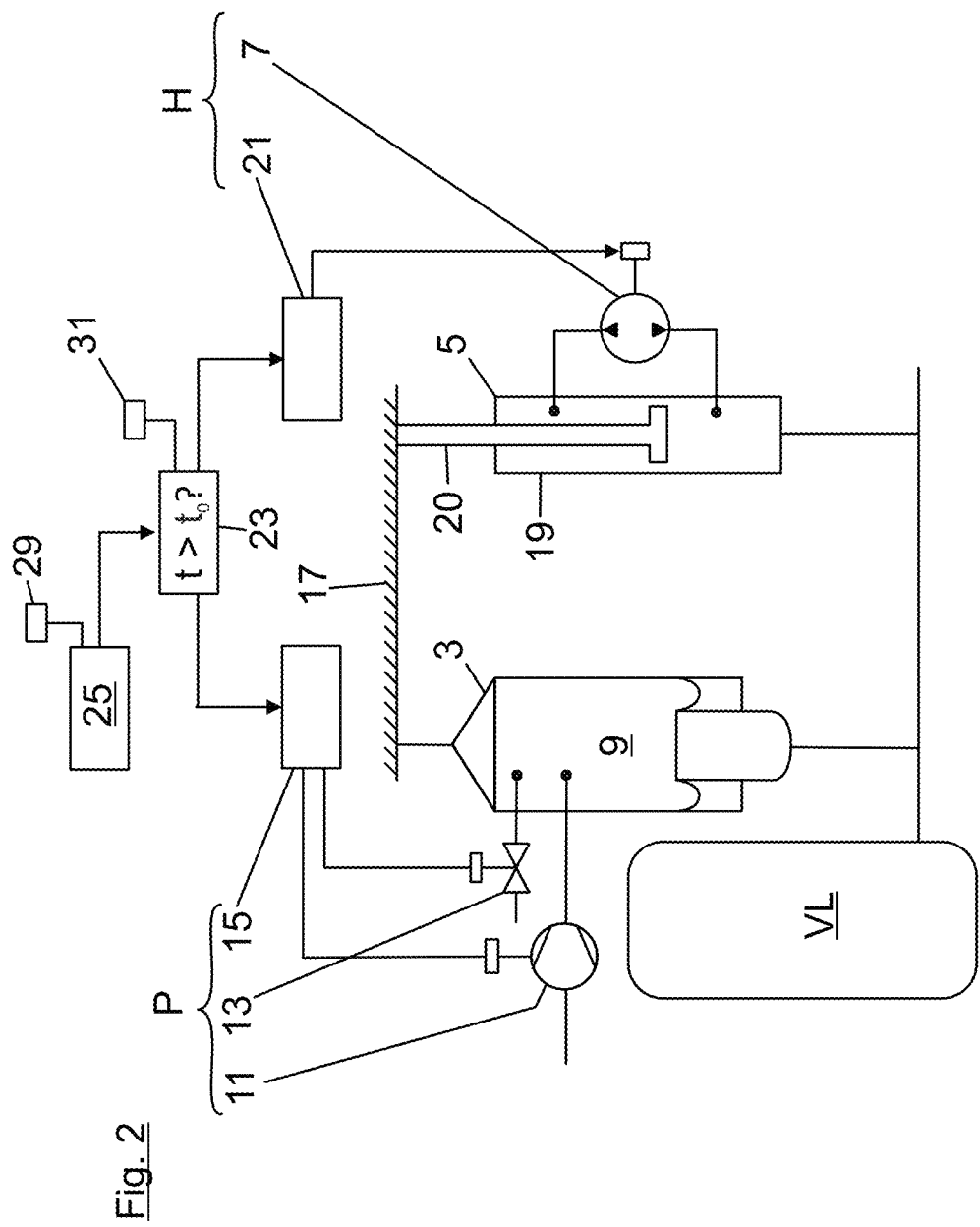
FIG. 2 shows another view describing the structure and the mode of operation of the active chassis according to the invention.

As can also be seen from FIG. 2, the telescopic shock absorber 5 has a damper tube 19 into which a piston rod 21 plunges. The piston rod 21 delimits two hydraulic chambers in the damper tube 19. These, together with an oil pump 7, are part of a hydraulic circuit H. In the hydraulic circuit H, the oil pump 7 acts as a vertical dynamics actuator, which is actuatable by a vertical dynamics control unit 21.

Figure 3:
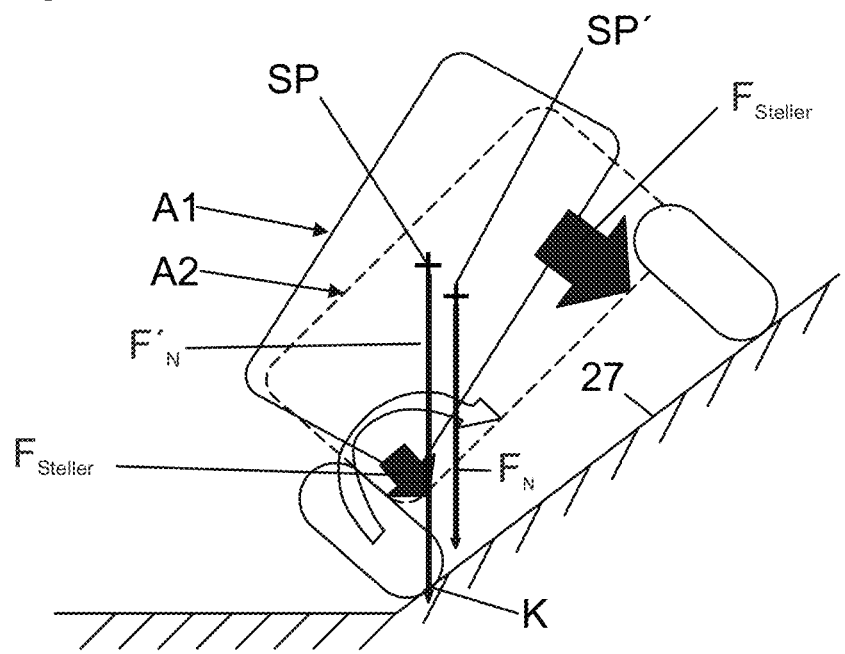
FIG. 3 shows another view describing the structure and the mode of operation of the active chassis according to the invention.

According to FIGS. 1 and 2, both the vertical dynamics control unit 21 and the air spring control unit 13 have a signal connection to an evaluation unit 23. The evaluation unit 23 is assigned a tipping detection function 25. With the aid of the tipping detection function 25, a roll-over risk is monitored during off-road driving, as indicated in FIG. 3. Accordingly, the vehicle is on a transversely inclined roadway 27, on which the vehicle wheels on the downhill side are retracted, while the vehicle wheels on the uphill side are extended. In a critical body position A1 indicated in FIG. 3, the normal force $F_N$ passing through the vehicle center of gravity SP is close to a contact point K of the vehicle wheel on the downhill side with the roadway 27. In this case, the tipping detection function 25 detects a high roll-over risk, which poses the danger that the vehicle will tip sideways on the transversely inclined roadway 27. If such a roll-over risk exists, the evaluation unit 23 first actuates the vertical dynamics control unit 21 so that the vertical dynamics actuators 7 immediately, i.e. in real time, bring the vehicle into a tipping-proof body position A2 by generating active actuating forces $F_{Steller}$. This is achieved by lowering the vehicle center of gravity SP with the aid of wheel-attracting active actuating forces $F_{Steller}$ and by reducing the roll angle by stronger deflection on the uphill side. The air spring control unit 13, however, is not yet actuated by the evaluation unit 23. In the tipping-proof body position A2 (indicated by dashed lines in FIG. 3), the center of gravity SP' and the normal force $F_N'$ passing through the center of gravity SP' are spaced apart from the contact point K in the direction of the uphill side.

When setting the tipping-proof body position A2, the vertical dynamics adjuster 7 works against the spring forces $F_{Luftfeder}$ generated by the air springs 3. The vertical dynamic actuators 7 can only keep the vehicle in its tipping-proof body position with an external energy supply, during which the oil pump 7 has to be permanently supplied with electrical energy.

According to the invention, the following control strategy is generally used to permanently maintain the tipping-proof body position A2: First, the evaluation unit 23 actuates the vertical dynamics control unit 21 alone. As soon as a criterion for the existence of a permanent tipping situation is met, a transfer phase $\Delta t_U$ follows, in which the evaluation unit 23 actuates both the air spring control unit 15 and the vertical dynamics control unit 21. During the transfer phase $\Delta t_U$, the actuating forces $F_{Steller}$ generated by the vertical dynamic actuators 7 are continuously reduced to zero; synchronously thereto, the air spring control unit 13 starts a level control in which the vent valve 13 is opened, by which the air pressure acting in the respective air spring 3 and thus the spring force $F_{Luftfeder}$ generated by the air spring 3 are dissipated to a value at which the air springs 3 maintain the tipping-proof body position A2, while at the same time the vertical dynamics actuators 7 are completely relieved of load, i.e. are switched to non-functional at the end of the transfer phase $\Delta t_U$.

Figure 4:
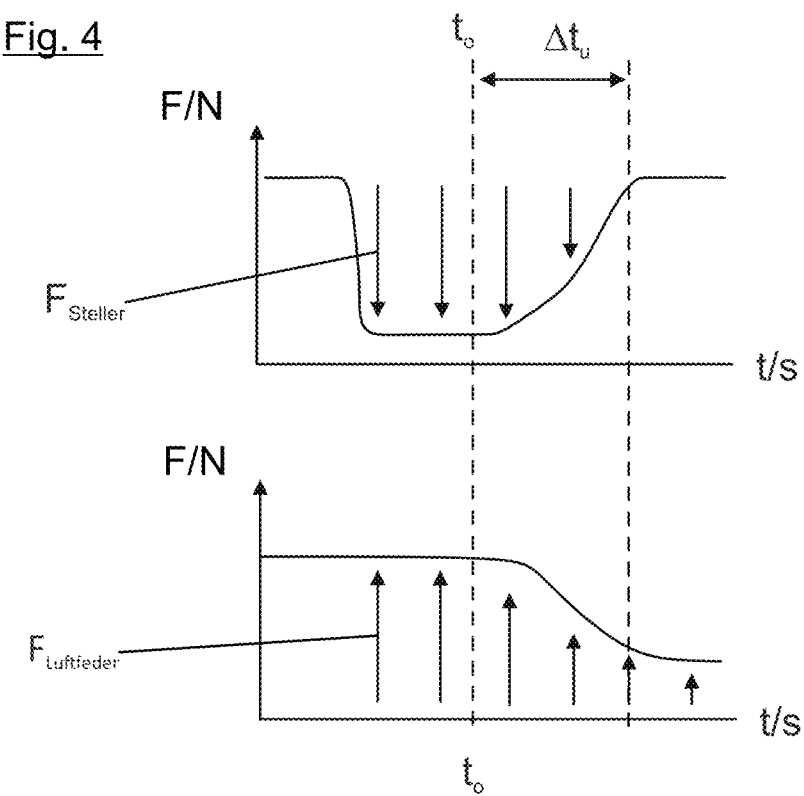
FIG. 4 shows another view describing the structure and the mode of operation of the active chassis according to the invention.

In the present exemplary embodiment, the criterion for the existence of a permanent tipping situation is specifically a time criterion, i.e. the holding period $t_0$. This results in the following control strategy, which is illustrated by the diagrams in FIG. 4: The evaluation unit 23 actuates the vertical dynamics control unit 21 alone until the predefined holding period $t_0$ elapses. This means that until the holding period to elapses, the negatively oriented actuating forces $F_{Steller}$ are introduced into the telescopic shock absorbers 5. Until the holding period to elapses, only the vertical dynamics actuators 7 (i.e. the oil pumps) therefore hold the vehicle in its tipping-proof body position A2.

After the holding time to has elapsed, the transfer phase $\Delta t_U$ described above follows, in which the evaluation unit 23 actuates both the air spring control unit 15 and the vertical dynamics control unit 21.

It should be emphasized that the criterion for the existence of a permanent tipping situation can also comprise other conditions alternatively and/or additionally to the time criterion, such as applying the parking brake, the parking mode, the status of the operational readiness of the vehicle (such as ignition off), and operation of the central locking system.

As can also be seen from FIGS. 1 and 2, the anti-tipping function 25 has a display means 29 which triggers a warning message for the vehicle user if a critical tipping situation A1 is detected. In addition, the evaluation unit 23 is assigned an input means 31 which is operable by the vehicle user. By operating the input means 31, the vehicle user can manually actuate the vertical dynamics control unit 21 so that the vertical dynamics actuators 7 set a tipping-proof body position A2.

LIST OF REFERENCE SIGNS

3 suspension spring or air spring
5 telescopic shock absorber
7 vertical dynamics actuator
9 air chamber
11 air compressor
13 vent valve
15 air spring control unit
17 vehicle body
19 damper tube
20 piston rod
21 vertical dynamics control unit
23 evaluation unit
25 tipping detection function
27 roadway
29 display means
31 input means
A1 tipping-critical body position
A2 tipping-proof body position
SP, SP' center of gravity
K contact point
$F_N$, $F_N'$ normal force
$F_{Luftfeder}$ spring force of the air spring
$F_{Steller}$ actuating force of the vertical dynamics actuator
HL, HR, VL, VR vehicle wheels
$\Delta t_U$ transition phase
H hydraulic circuit
P pneumatic circuit

The invention claimed is:

1. A device for operating a chassis of a two-track vehicle, in which each vehicle wheel is assigned a suspension spring, which carries the static body weight of the vehicle, and a vertical dynamics actuator, which is actuatable by a vertical dynamics control unit, having a tipping detection function which detects a tipping situation with a roll-over risk in which there is a danger that the vehicle will tip sideways on a transversely inclined roadway, wherein when a roll-over risk is detected, the vertical dynamics control unit actuates the vertical dynamics actuators to lower the vehicle center of gravity and/or to reduce a roll angle on an uphill side until a predetermined body position of the vehicle is reached, wherein if a tipping situation exists, the vertical dynamics control unit automatically actuates the vertical dynamics actuators, and/or the tipping protection function is assigned a display means which triggers a warning message for the user if a critical tipping situation is detected, and/or the device has an input means operable by the user by which the vertical dynamics control device is manually actuatable by the user in order to achieve the predetermined position.

2. The device according to claim 1, wherein the vertical dynamic actuators operate electromechanically or hydraulically.

3. The device according to claim 2, wherein the suspension spring is an air spring, the air chamber of which is integrated together with an air compressor acting as an actuator and with at least one vent valve in a pneumatic circuit, (P) in which the air compressor and the vent valve are actuatable by an air spring control unit.

4. The device according to claim 2, wherein each of the vehicle wheels is assigned a telescopic shock absorber having a damper tube as a damper device, into which a piston rod plunges, and that the hydraulic chambers delimited by the piston rod are integrated together with an oil pump acting as an actuator in a hydraulic circuit (H), in which the oil pump is actuatable as a vertical dynamics actuator by the vertical dynamics control unit.

5. The device according to claim 1, wherein the suspension spring is an air spring, the air chamber of which is integrated together with an air compressor acting as an actuator and with at least one vent valve in a pneumatic circuit, (P) in which the air compressor and the vent valve (are actuatable by an air spring control unit.

6. The device according to claim 5, wherein the air spring can be used as a slow actuator and the vertical dynamics actuator can be used as a fast actuator in comparison.

7. The device according to claim 6, wherein the device has an evaluation unit which has signal connection to the tipping detection function, and/or in the event of a critical tipping situation, the evaluation unit first actuates the vertical dynamics actuators in order to achieve a tipping-stable body position, while the air springs are not actuated by the evaluation unit.

8. The device according to claim 5, wherein the device has an evaluation unit which has signal connection to the tipping detection function, and/or in the event of a critical tipping situation, the evaluation unit first actuates the vertical dynamics actuators in order to achieve a tipping-stable body position, while the air springs are not actuated by the evaluation unit.

9. The device according to claim 5, wherein the vertical dynamics actuators, when actuated by the vertical dynamics control unit, suddenly generate an actuating force ($F_{Steller}$), by which the vehicle body can be lowered, counter to a spring force ($F_{Luftfeder}$) acting in the opposite direction and generated in the air springs, and the actuating force ($F_{Steller}$) generated by the vertical dynamics actuators is only maintained by external energy.

10. The device according to claim 9, wherein until a criterion for the existence of a permanent tipping situation is met, wherein until a predefined holding period ($t_o$) or other conditions have elapsed, the vertical dynamics actuators hold the vehicle in its tipping-proof body position, and that after the holding period ($t_0$) has elapsed, the evaluation unit actuates the air spring control unit to start a level control during which the air pressure acting in the respective air spring and thus the spring force generated by the air spring can be dissipated by opening the vent valve, so that the tippping-proof body position is held by the air springs after the holding time ($t_0$) has elapsed, while the vertical dynamics actuators are relieved.

11. The device according to claim 10, wherein the vent valve is electrically actuatable by the air spring control unit, and the vent valve is closed when de-energized, so that the tipping-proof body position is maintained without external energy.

12. The device according to claim 1, wherein each of the vehicle wheels is assigned a telescopic shock absorber having a damper tube as a damper device, into which a piston rod plunges, and that the hydraulic chambers delimited by the piston rod are integrated together with an oil pump acting as an actuator in a hydraulic circuit (H), in which the oil pump is actuatable as a vertical dynamics actuator by the vertical dynamics control unit.

* * * * *